United States Patent [19]

Vecchiarino

[11] Patent Number: 5,268,619
[45] Date of Patent: Dec. 7, 1993

[54] DEVICE FOR THE CONTROLLED ROTATION OF A DOOR MIRROR

[75] Inventor: Luigi Vecchiarino, Vaprio D'Adda, Italy

[73] Assignee: Commer S.p.A., Ill.X

[21] Appl. No.: 980,277

[22] Filed: Nov. 23, 1992

[30] Foreign Application Priority Data

Nov. 29, 1991 [IT] Italy .................. MI91 A 003212

[51] Int. Cl.⁵ .................................................. G02B 7/198
[52] U.S. Cl. ........................................ 318/3; 307/10.1; 359/841
[58] Field of Search .................. 318/1, 2, 3, 264, 265, 318/266, 286, 466, 467, 468, 469; 307/9.1, 10.1; 248/477, 478; 359/841, 843, 844

[56] References Cited

U.S. PATENT DOCUMENTS

| | | | |
|---|---|---|---|
| 3,599,927 | 8/1971 | Talbot | 248/484 |
| 4,273,417 | 6/1981 | Mittelhauser | 359/873 |
| 4,798,967 | 1/1989 | Yamana et al. | 318/568 X |
| 4,936,670 | 6/1990 | Yoo | 248/480 X |
| 4,940,322 | 7/1990 | Hamamoto et al. | 307/10.1 X |
| 4,973,146 | 11/1990 | Nakayama | 318/445 X |
| 4,981,347 | 1/1991 | Nakayama | 318/466 X |
| 4,982,926 | 1/1991 | Mori et al. | 248/479 |
| 5,210,651 | 5/1993 | Shibuya et al. | 359/841 |

*Primary Examiner*—Bentsu Ro
*Attorney, Agent, or Firm*—Lerner, David, Littenberg, Krumholz & Mentlik

[57] ABSTRACT

In a device for the controlled rotation of a door mirror between an operative position and a rest position, comprising elastic means to retain and position the mirror on a fixed base as well as at least an electric motor actuating the rotation of the movable portion of said door mirror, means are provided to detect the operative position only of said mirror and consequently enable the operation of said electric motor.

9 Claims, 2 Drawing Sheets

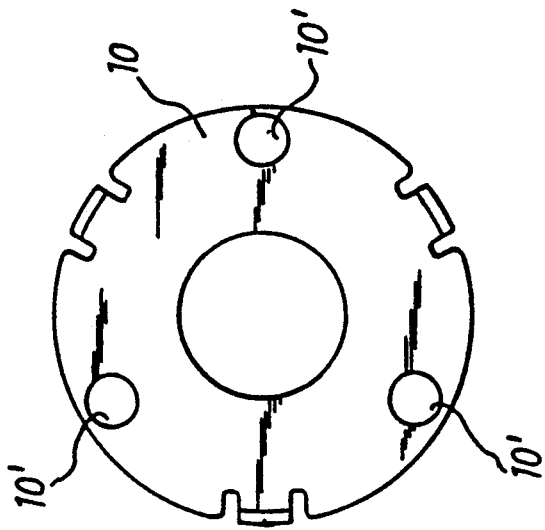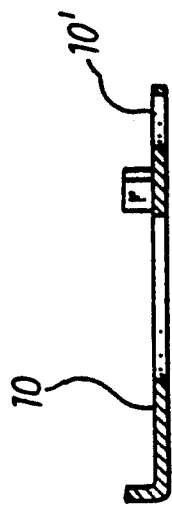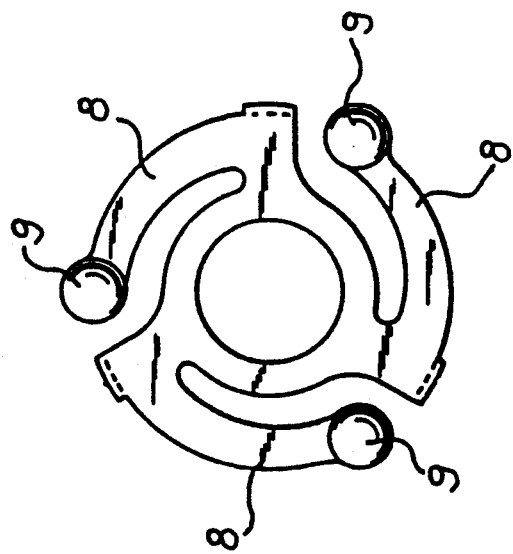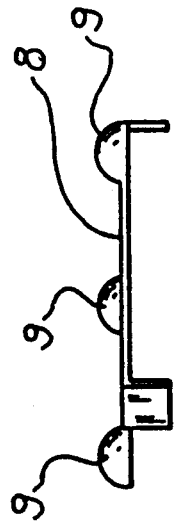

DEVICE FOR THE CONTROLLED ROTATION OF A DOOR MIRROR

FIELD OF THE INVENTION

The present invention concerns a device for the controlled rotation of door mirrors for motor vehicles. Safety regulations prescribe the collapsibility, under the action of a predetermined force, of the mobile portion of door mirrors, namely their outer cover as well as all the components contained therein and supported therewith by the mirror frame, on a small base fixed to the motor vehicle.

There is at the same time the need to perform a controlled not casual rotation of the outer cover and in particular the need to have reference points in order to position the frame quickly and univocally, at least in its operative position, namely the position taken during the vehicle ride.

For this purpose the frame and supporting base of the door mirror are stressed towards one another by means of one or more elastic elements, generally consisting of springs arranged around the pivot of rotation of the cover and placed under compression by a nut screwed on said pivot, in a way to obtain, by means of one or more friction elements, a resistance sufficient to control the rotation thereof.

DESCRIPTION OF THE PRIOR ART

In order to obtain a controlled rotation of the door mirror by means of an electric motor, devices have been proposed in which the movement of the door mirror mobile portion is controlled by a plurality of microswitches that, as a function of their condition, give the position of the outer cover in respect of the fixed base. This solution must moreover comprise the above described retaining and positioning elements. The complex configuration of said embodiment involves high costs and greater possibility of malfunctioning occurance.

OBJECT OF THE INVENTION

An object of the present invention is to solve the aforesaid problems by means of a device for the controlled rotation of door mirrors having a simple and reliable construction as well as reduced costs.

SUMMARY OF THE INVENTION

Said object is achieved by means of the present invention that concerns a device for the controlled rotation of a door mirror between an operative position and a rest position, comprising elastic means to retain the door mirror on a fixed base as well as at least an electric motor for the motorized rotation of the mobile portion of said mirror, characterized in that it comprises means to detect the operative position only of said mirror and consequently to enable actuation of said electric motor. According to a preferred feature of the invention, the retaining and positioning elastic means are constituted by a Belleville washer and by a substantially flat elastic element fastened to the fixed portion of the mirror. Said element also carries a plurality of arms provided with projections, and movable between a position of engagement of a corresponding plurality of seats present on the mobile portion, and a flexed position of disengagement from said seats.

According to another preferential feature of the invention, the reduction gear connected to said electric motor causing the rotation engages a lower ring gear which is on its turn engaged with elastic retaining means. Furthermore the lower ring gear insists by means of friction elements on the outer casing of the door mirror to move therewith during the manual rotation of same and remaining fixed in respect thereof during electric rotation.

The invention will be now described more in detail with reference to the drawings given with illustrative and non limiting purposes.

BRIEF DESCRIPTION OF THE DRAWINGS

FIGS. 2 to 5 are views of preferential retaining and positioning elements.

DESCRIPTION OF THE PREFERRED EMBODIMENTS

Figure 1:
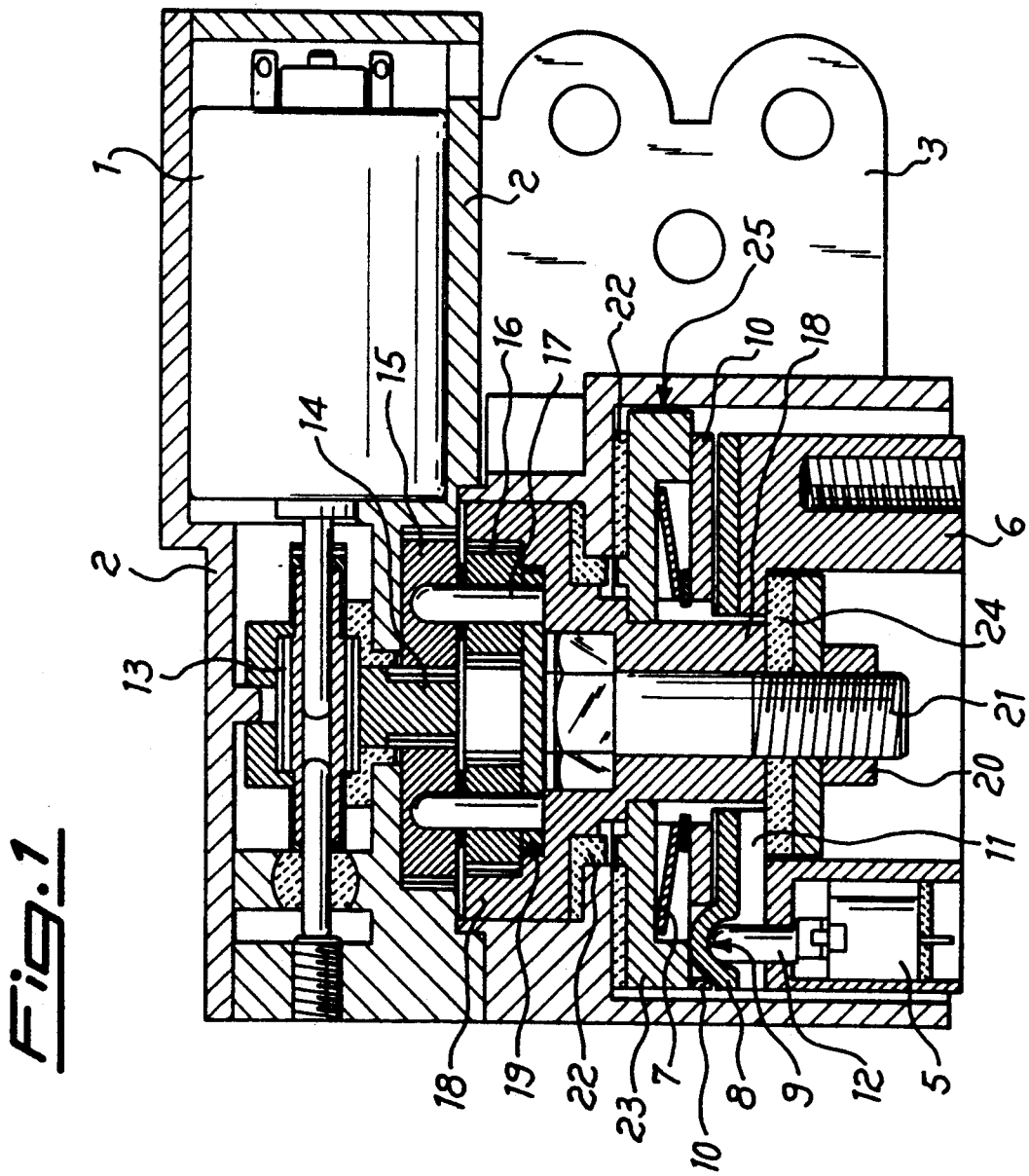
FIG. 1 is a cross sectional view of the rotation and retaining unit for a door mirror according to the invention.

With reference first of all to FIG. 1, the device for the controlled rotation of the door mirror by electrical and manual operations comprises an outer casing 2 fixable by means of tabs 3 to the cover of the door mirror and rotatable therewith. Inside said casing 2 there are provided an electric motor 1, a series of gears forming a reduction unit, a lower crown gear and retaining and positioning elastic means. Said means are known per se and are of the type consisting of a plurality of mobile or fixed seats integral to one mobile or fixed portion of the door mirror, and of a corresponding plurality of projections integral to the remaining portion of the door mirror, and engaged with the aforesaid seats under the action of a spring.

One portion of the device is movable by electrical means; the same portion, together with further elements, can be moved also manually.

According to the present invention there are provided means to detect only whether the door mirror is placed in its operative position (i.e. that of the vehicle ride) and consequently to enable the electrical rotation by means of the motor 1. Said detecting and enabling means are constituted by a microswitch 5 capable of detecting the position of engagement or disengagement of the projections and seats of the aforesaid retaining and positioning means.

Preferably the microswitch 5 is accomodated within the fixed base 6 of the door mirror and is actuated by the retaining and positioning means which for this purpose are rotatable only manually.

Preferably the retaining and positioning means are constituted by a Belleville washer 7 that ensures the necessary stress, and by a substantially flat element 8 fastened to a fixed or mobile portion of the door mirror and provided with a plurality of arms bearing a corresponding number of projecting portions 9. Said arms 8 are elastically movable between an engagement position of a corresponding plurality of seats arranged on the remaining movable or fixed portion of the door mirror and a flexed position of disengagement from said seats.

In the preferential embodiment as shown, the elastic element 8 is fastened to the fixed base 6 and the seats housing the projections 9 are provided in a small plate 10 on its turn fastened to the movable portion of the door mirror. In order to allow flexure of the arms of the elastic element 8, the fixed base 6 is provided with undercuts 11 positioned in correspondence to the arms 8.

One of said undercuts 11 is therefore provided in correspondence to the operative position of the door mirror and partially accomodates the pin 12 of the microswitch 5 that is engaged with the lower face of a projection 9.

FIGS. 2 and 5 show two preferential embodiments of the retaining and positioning elements, which are moreover described in the Italian application for Utility Model n. 21192-B/90 filed by the applicant. Said application allows for a more in-depth description of said elements.

As mentioned hereinabove, the electric motor 1 actuates a cascade of gears that form a reduction gear unit which is preferably of the epicycloidal type. In the embodiment of FIG. 1 the shaft or motor 1 actuates by means of a worm screw 13 a gear wheel with pinion 14 which on its turn moves a plurality of upper 15 and lower 16 planetary gears, integral to each other and aligned on pivots 17 mounted on a small plate 19. The upper planetary gears 15 are engaged with a toothed portion of the casing 2 whereas the lower planetary gears 16 engage a toothed bushing 18.

The bushing 18 allows the whole device to be fastened on the fixed base 6 by means of a nut 20, a bolt 21 and a low friction coefficient washer 24 and is engaged with the casing 2 by means of friction element 22 that allow the bushing 18 to rotate in respect of the fixed base 6 only when the door mirror is manually moved.

One of said friction elements is interposed between the casing 2 and a supporting ring 23 keyed on the lower portion of the bushing 18. On the ring 23 there is mounted integral thereto (for example by means of serrations), a positioning small plate 10, that is then mobile together with the ring 23, only during the manual rotation of the door mirror.

The ring 23 moreover presents a projecting portion 25 that is engageable with a rib (not shown) placed inside the casing 2 with the function of stop for the electric rotation of the door mirror.

The operation of the device is evident from the preceding description. When the door mirror is in its operative position, or in the position of the vehicle ride, the projection 9 of arm 8 engages the seat 10' of the small plate 10, and the microswitch 5, which detects the position of said projection 9 by means of pin 12, enables the operation of the motor 1.

If at this point the motor 1 starts working, it causes the rotation of the planetary gears 15 and 16 through the worm screw 13 and the pinion 14. Thanks to the friction elements 22, the casing 2 can translate with respect of the bushing 18 that is fixed to the base 6 together with the retaining and positioning means 7-10, 23. The electric rotation of the door mirror continues until projection of the ring 23 meets the stop rib provided in the casing 2 and the motor 1 is overloaded: at this point overload sensors (not shown), as known in the technique, cause the motor to stop.

If the door mirror undergoes a stress when the motor 1 is not working, the busing 18, being integral to the casing 2 thanks to the reducing unit, rotates with the casing, with the ring 23 and with the small plate 10, forcing the elastic arm 8 into the relevant undercut 11 and disabling the electric rotation of the motor. In this case, too, stops are provided, generally constituted by the remaining projections 9 and seats 10' of the plate 10 (FIGS. 2-5). Therefore in case of electric rotation the microswitch 6 does not change its condition and the rotation of the motor 1 is still enabled. It will thus be sufficient to operate the reverse rotation to bring the door mirror back from its rest position previously reached, for example that of parking, to the ride position.

On the contrary in case the motor is disabled due to a mechanical stress (e.g. a stroke) it will be necessary to rotate manually the door mirror in order to bring it back to the ride position and thus restore the possibility of electric rotation.

I claim:

1. A device for the controlled rotation of a door mirror comprising a movable portion mounted on a fixed base between an operative position and a rest position, comprising elastic means to clamp and position the door mirror on said fixed base, at least an electric motor actuating the rotation of the movable portion of said mirror, and detecting and enabling means for detecting only the operative position of said door mirror and consequently enabling the operation of said electric motor.

2. A device according to claim 1, wherein said detecting and enabling means comprises a microswitch connected in series with said electric motor.

3. A device according to claim 2, wherein said elastic means comprise a substantially flat element fastened to one of said fixed base or movable portion of the door mirror and bearing a plurality of arms provided with projections, the other of said fixed base or movable portion of said door mirror including a corresponding plurality of seats, said elastic means being elastically movable between a planar position of engagement with said corresponding plurality of seats and a flexed position of disengagement from said plurality of seats.

4. A device according to claim 3, wherein said microswitch is housed within said fixed base and is actuated by said elastic means, said elastic means being fastened to a portion of the device which is fixed during the electric rotation of the door mirror and mobile during the manual rotation thereof.

5. A device according to claim 4, including a positioning small plate integral to said movable portion, said plurality of seats being formed in said positioning small plate and said elastic means is fastened to said fixed base.

6. A device according to claim 5, wherein said elastic means includes elastic arms, said microswitch is engaged with one of said elastic arms.

7. A device according to claim 5, including a shaped and toothed bushing in engagement with said motor by means of a reduction gear unit, with the fixed base by means of fastening means, and with said movable portion of the door mirror by means of a friction element, said shaped and toothed bushing being integral to said positioning small plate.

8. A device according to claim 1, including stops for the electric rotation of the mirror and including overload sensors for said electric motor.

9. A device according to claim 3, including stops for the manual rotation of the mirror, consisting of said plurality of seats and projections of the elastic means.

* * * * *

UNITED STATES PATENT AND TRADEMARK OFFICE
CERTIFICATE OF CORRECTION

PATENT NO. : 5,268,619
DATED : December 7, 1993
INVENTOR(S) : Luigi Vecchiaeino

It is certified that error appears in the above-indentified patent and that said Letters Patent is hereby corrected as shown below:

On the title page: Item [73] Assignee

Delete "Ill.X" and insert therefor --Italy--.
Column 3, line 14, delete "or" and insert therefor --of--.
    line 58, delete "busing" and insert therefor --bushing--.

Signed and Sealed this

Third Day of May, 1994

Attest:

BRUCE LEHMAN

*Attesting Officer*     *Commissioner of Patents and Trademarks*